Aug. 24, 1954  J. F. THORP  2,687,073
EXTENSION ASSEMBLY FOR TRACTOR-MOUNTED IMPLEMENTS
Filed June 2, 1953  2 Sheets-Sheet 1
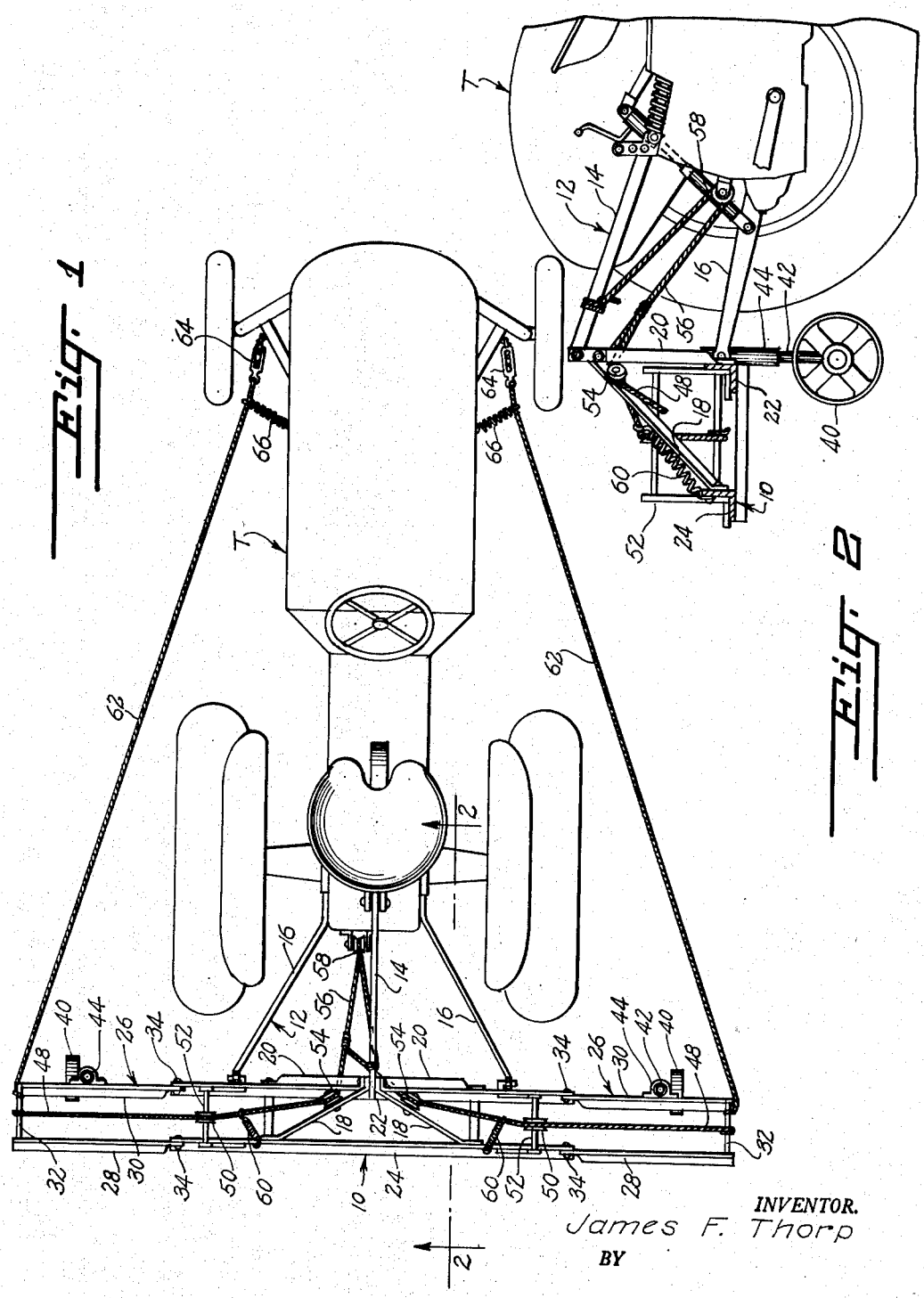
INVENTOR.
James F. Thorp
BY
McMorrow, Berman + Davidson
ATTORNEYS Aug. 24, 1954    J. F. THORP    2,687,073
EXTENSION ASSEMBLY FOR TRACTOR-MOUNTED IMPLEMENTS
Filed June 2, 1953    2 Sheets-Sheet 2
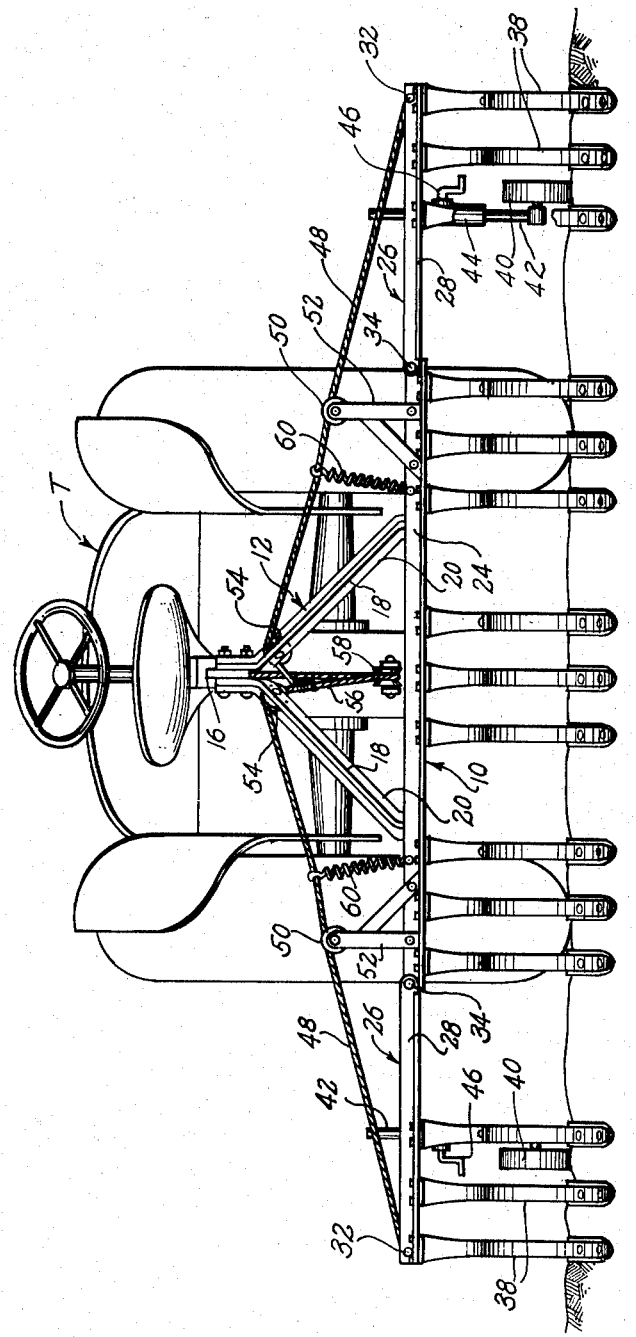
INVENTOR.
James F. Thorp
BY
McMorrow, Berman & Davidson
ATTORNEYS Patented Aug. 24, 1954

2,687,073

UNITED STATES PATENT OFFICE 2,687,073

EXTENSION ASSEMBLY FOR TRACTOR-MOUNTED IMPLEMENTS

James F. Thorp, Clinton, Ill.

Application June 2, 1953, Serial No. 359,047

2 Claims. (Cl. 97—46.07)

This invention relates to an extension assembly for tractor-mounted implements, such as cultivators, spring tooth harrows, spike tooth harrows, etc. More particularly, the invention has reference to an extension assembly comprising extension frames connectible to the opposite ends of an implement frame, so as to increase the overall width of the implement and thereby cause said implement to condition a substantially greater ground area, in the same amount of time, as is now acted upon by conventional implements not provided with extension means. Heretofore, the overall width of a tractor-mounted implement, that is, the dimension of the implement when considered transversely of the tractor, has been limited due to the relative inflexibility of the implement, which renders the same incapable of adapting itself to uneven terrain.

In view of the above, the main object of the present invention is to provide an extension assembly for any of various tractor-drawn implements, which assembly will be highly flexible, so as to permit the same to adapt itself automatically to differences in ground contour, encountered during use of the device.

Another object of importance is to provide a structure of the character stated, which will be so formed as to permit the extension frames of the structure to be used for mountings on which can be secured any of various ground-engaging devices, such as cultivator shovels, sweeps, etc.

Another object of importance is to provide an extension assembly for tractor-drawn implements which will be specifically adapted for use in association with the conventional three-point hydraulic lift structure of the tractor.

Another object is to provide an extension assembly as described which will be elevated or lowered, on normal upward or downward movement of the hydraulic lift means of the tractor, this operational characteristic being obtained through the use of a novelly designed series of flexible elements and associated pulleys.

Other objects will appear apparent from the following description, the claims appended thereto, and from the annexed drawings, in which like reference characters designate like parts throughout the several views, and wherein:

Figure 1 is a top plan view of a tractor, a conventional implement drawn thereby, and of an implement extension assembly formed in accordance with the present invention;

Figure 2 is a fragmentary, transverse sectional view on line 2—2 of Figure 1; and Figure 3 is a rear elevational view of the tractor, the implement, and the extension assembly.

The reference letter T has been applied in the drawing to designate a conventional tractor, and it will be understood at this point that the tractor can be any one of various makes or types. The tractor is provided, in the illustrated example of the invention, with a conventional, three-point hydraulic lift mechanism designated generally by the reference numeral 12. The mechanism 12 is connected to a conventional, tractor-drawn implement designated generally by the reference numeral 10, said implement being, in the illustrated example of the invention, of the tiller type. The hydraulic lift mechanism includes a top or compression link 14, bottom or tension links 16, and upwardly converging braces 18, 20, connected at their convergent ends to the outer end of the top link. The braces 18, at their lower or divergent ends, are connected to a rear frame member 24 of the implement 10, the lower or divergent ends of braces 20 being connected to a front frame member 22 of said implement.

The extension assembly constituting the present invention includes, at opposite ends of the implement 10, extension frames designated generally by the reference numeral 26. The frames 26 are each formed with parallel rear and front frame members 28, 30 respectively, said frame members 28, 30 being fixedly connected in spaced relation at their outer ends by a cross brace 32. At their inner ends, the members 28, 30 are pivotally connected to the members 24, 22, respectively, by means of pivot pins 34. By reason of this construction, the extension frames 26 are swingable about horizontal axes, upwardly and downwardly relative to the conventional main implement 10.

The frames 26 can be used to support any of various ground-engaging devices, and in the illustrated example of the invention, are employed as mountings for depending teeth 38, said teeth being identical to teeth depending from the frame of the main implement 10. However, it should be noted at this point that the particular type of ground-engaging device carried by the extension frames is immaterial, and said frames could be employed for supporting cultivator shovels, etc.

In the illustrated example of the invention, gauge means is provided upon the extension frames 26, for regulating the height or elevation of the extension frames. Said gauge means of each extension frame includes a ground wheel 40, rotatably mounted upon a lateral extension provided upon the lower end of a substantially vertically disposed spindle 42, which is fixedly secured within a sleeve 44 by means of a crank 46. The crank 46, as will be understood, is adapted to shift inwardly of the sleeve 44 on rotation of the crank, so as to bind against the spindle 42, thus to hold the spindle in a selected position of vertical adjustment within its associated sleeve.

The gauge means, however, can be varied, and it is not believed that the ground wheel and spindle mounting would be necessarily used in every commercial embodiment of the invention. In a more inexpensive construction, one might secure the wheel spindles to the frames 26 by means of U-clamps or the like, said U-clamps being conventional, per se, and thus adding little to the cost of manufacture of the structure.

In still other examples, the extension assemblies might be devoid of gauging devices, and it is believed that this would be true of practically all implements, with the exception of cultivators.

Connected at their outer ends to the cross braces 32 are cables or other flexible elements 48. These are extended inwardly from the outer ends of the extension frames, and intermediate their ends are trained about idler pulleys 50 mounted upon brackets 52 upstanding from the opposite ends of the implement 10.

As will be noted from Figure 3, the flexible elements 48 are inclined upwardly from the outer ends of the structure, said flexible elements being trained, substantially at the mid-length portion of the complete structure, over pulleys 54 rotatably mounted upon the braces 18 of the hydraulic lift mechanism. The pulleys 54, as will be noted, are disposed obliquely to the longitudinal center line of the implement 10, thus to effect a change in direction of the flexible elements 48. The flexible elements 48 are extended in the direction of the tractor after being trained over the idler pulleys 54, and are secured to one end of a main flexible element 56. Element 56 is trained about an idler pulley 58 mounted rotatably upon a bracket carried by the rear end of the tractor T. Element 56, after being trained about the pulley 58, is secured to the outer end portion of the top link 14.

For the purpose of maintaining the elements 48, 56 under tension, springs 60 are provided. Each spring 60, as shown in Figure 3, is hooked at one end about a cable 48, the other end of each spring being hooked to the rear frame member 24 of the implement 10.

The springs 60, tending to compress, will maintain the elements 48, 56 under tension at all times. However, said springs will not exert downward pull upon the elements 48 to such an extent as will cause the extension frames 26 to pivot upwardly, during normal use of the implement 10 and its associated extension assembly, about the pivot axes thereof.

For the purpose of stabilizing the ends of the extension assembly against rearward movement, which movement would tend to weaken the connections of the frames 26 to the implement 10, I provide side cables 62, these being connected at one end to the outer ends of the frames 26. At their other ends, the cables 62 are connected to the opposite sides of the front portion of the tractor T, turnbuckles 64 being employed for the purpose of maintaining the side cables 62 under a selected, adjusted tension. Springs 66 are extended between the front end portions of cables 62 and the opposite sides of the tractor T, for the purpose of cooperating with the turnbuckles in maintaining the cables 62 under tension. It will be noted, in this regard, that the turnbuckles not only serve to tension the cables 62, but also comprise means for adjusting the overall length of the cables 62.

It will be appreciated that during use of the extension assemblies and an associated implement 10, the extension frames 26 will be free to swing upwardly and downwardly, to a selected, predetermined extent, about their pivot axes. The upward and downward swinging movement of the extension frames, of course, is desirable to permit the structure to adapt itself to unevenness in the ground contour, the extension frames being free to ride over mounded areas, and also being free to move downwardly through depressions in the ground. The weight of the extension frames, of course, permit said frames to swing downwardly about their pivot axes, against the restraining tendency of springs 60.

In any event, as the tractor is moved over the field, the extension assemblies will flex relative to the main implement 10, thereby to insure that a wide swath will be properly conditioned, despite the substantially increased length of the implement. It will be observed, in this regard, that the overall length of the implement can be increased approximately one-hundred percent, thereby to cause the structure to condition twice as much ground, in a given amount of time, as has heretofore been possible, under ordinary circumstances.

When the implement is to be lifted out of engagement with the ground, the hydraulic lift mechanism of the tractor is used in the normal way, and upward swinging movement of the top link 14 will serve to exert pull upon the element 56, which pull will be transmitted, in turn, to the flexible elements 48. As a result, the elements 48 will pull upwardly upon the outer ends of the extension frames 26, thus swinging said extension frames upwardly to an inoperative position.

It will be understood that different heights for the extension frames 26 can be obtained, by attaching the flexible element or cable 56 to the top link 14 at selected points along its length.

It should also be understood that the springs 66 serve an important function, in that they take up slack in the side cables 62, when the outer ends of the extension frames 26 are raised to an inoperative position.

I also believe that it is sufficiently obvious as not to require special illustration that depending upon the particular shape and size of the implement 10, the pivotal mounting of the extension frames might be subject to variation. Further, on different makes of tractors there would be different mountings for the pulley 58, this being thought sufficiently obvious in view of the different shapes of the transmission housings, on tractors of various makes.

A feature of the structure, believed to be of importance, resides in the adaptability of the extensions for elevation by hand to an inoperative position in which said extensions are vertically disposed to facilitate transportation over roads, passing through gates, and the conservation of storage space. This can be accomplished by using cables or hooks to fasten the outer ends of the extensions together, with said cables or hooks extending between the cross braces 32. Alternatively, short connecting elements might be used, to tie the cross braces 32 to the adjacent brackets 52.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An extension assembly for a tractor-drawn implement comprising, in combination with an implement attached to and disposed transversely of a tractor, and with a three-point hydraulic lift mechanism mounted on said tractor for raising and lowering the implement, said mechanism including a vertically swingable top link, a pair of extension frames hingedly connected at their inner ends to the opposite ends of said implement, said frames being aligned longitudinally with the implement so as to increase the overall length thereof, the frames being freely swingable about their hinge axes so as to adapt the same for conditioning ground of uneven contour; pulley brackets upstanding from the opposite ends of said implement; pulleys rotatably mounted on said brackets; cables connected at one end to the outer ends of the extension frames, said cables being trained intermediate their ends over said pulleys; spring means connected between the cables and the opposite end portions of said implement, for maintaining said cables under a selected tension; pulleys rotatably mounted upon said hydraulic lift mechanism, the cables being trained at their other ends about said last-named pulleys; and a flexible element connected to said last-named ends of the cables, said flexible element being connected to the outer end of said top link and being trained intermediate its ends about a tractor-mounted idler pulley, whereby to exert upward pull upon the first-named ends of the cables responsive to upward swinging movement of the top link, to swing the extension frames upwardly to selected, inoperative positions.

2. An extension assembly for a tractor-drawn implement comprising, in combination with an implement attached to and disposed transversely of a tractor, and with a three-point hydraulic lift mechanism mounted on said tractor for raising and lowering the implement, said mechanism including a vertically swingable top link, a pair of extension frames hingedly connected at their inner ends to the opposite ends of said implement, said frames being aligned longitudinally with the implement so as to increase the overall length thereof, the frames being freely swingable about their hinge axes so as to adapt the same for conditioning ground of uneven contour; pulley brackets upstanding from the opposite ends of said implement; pulleys rotatably mounted on said brackets; cables connected at one end to the outer ends of the extension frames, said cables being trained intermediate their ends over said pulleys; spring means connected between the cables and the opposite end portions of said implement, for maintaining said cables under a selected tension; pulleys rotatably mounted upon said hydraulic lift mechanism, the cables being trained at their other ends about said last-named pulleys; a flexible element connected to said last-named ends of the cables, said flexible element being connected to the outer end of said top link and being trained intermediate its ends about a tractor-mounted idler pulley, whereby to exert upward pull upon the first-named ends of the cables responsive to swinging movement of the top link, to swing the extension frames upwardly to selected, inoperative positions; and side cables each connected at one end to the tractor forwardly of said implement and connected at its other end to the outer end of an extension frame for holding the extension frame against rearward swinging movement.

References Cited in the file of this patent

UNITED STATES PATENTS

| Number | Name | Date |
|---|---|---|
| 2,604,027 | Hansen | July 22, 1952 |
| 2,610,563 | Lambson | Sept. 16, 1952 |
| 2,618,214 | Ball | Nov. 18, 1952 |